US007373588B2

(12) United States Patent
Carro

(10) Patent No.: US 7,373,588 B2
(45) Date of Patent: May 13, 2008

(54) METHOD AND SYSTEM FOR ACCESSING INTERACTIVE MULTIMEDIA INFORMATION OR SERVICES BY TOUCHING MARKED ITEMS ON PHYSICAL DOCUMENTS

(75) Inventor: Fernando Incertis Carro, Valencia (ES)

(73) Assignee: International Business Machines Corporation, Armonk, NY (US)

(*) Notice: Subject to any disclaimer, the term of this patent is extended or adjusted under 35 U.S.C. 154(b) by 639 days.

(21) Appl. No.: 10/786,201

(22) Filed: Feb. 25, 2004

(65) Prior Publication Data

US 2004/0167895 A1 Aug. 26, 2004

(30) Foreign Application Priority Data

Apr. 26, 2000 (EP) .................................. 00480036

(51) Int. Cl.
*G06F 17/00* (2006.01)
(52) U.S. Cl. ...................... 715/203; 715/204; 715/205; 715/206; 715/207
(58) Field of Classification Search ................ 715/512, 715/513, 741, 203–207; 345/156
See application file for complete search history.

(56) References Cited

U.S. PATENT DOCUMENTS

| 5,692,073 | A | 11/1997 | Cass | 382/219 |
|---|---|---|---|---|
| 6,081,261 | A | 6/2000 | Wolff et al. | 345/179 |
| 6,326,946 | B1* | 12/2001 | Moran et al. | 345/156 |
| 6,330,976 | B1 | 12/2001 | Dymetman et al. | 235/487 |
| 6,356,923 | B1 | 3/2002 | Yano et al. | 707/513 |
| 6,448,979 | B1* | 9/2002 | Schena et al. | 715/741 |

OTHER PUBLICATIONS

Robinson et al http://www.cl.cam.ac.uk/research/origami/Origami1997c/index.html; published Nov. 1997 pp. 1-9.*

Meyer, A., "Pen Computing: A Technology Overview and a Vision," ACM SIGCHI Bulletin, vol. 27, No. 3, pp. 46-90 (Jul. 1995).

Robinson et al., "A Framework for Interacting with Paper," Eurographics, vol. 16, No. 3, pp. 1-10 (1997).

* cited by examiner

*Primary Examiner*—Doug Hutton
*Assistant Examiner*—Quoc A. Tran

(57) ABSTRACT

The present invention discloses a system and method for selecting and accessing multimedia information and/or services located on one or a plurality of servers connected to a communication network simply by touching with a finger items marked on a physical document or on any other physical surface. The system includes a touch foil placed over (or under) the document for reading coordinates of selected marked items, and a user workstation for accessing the information and/or the service associated with the selected marked items.

Items marked on the documents are selected by pressing the touch foil placed over (or under) the document. Once a marked item is selected, the user workstation receives from the touch foil a signal indicating the position of the selected marked item. The user workstation identifies in a hyperlink table a server and within this server the information and/or the service associated with the position of the selected marked item. Finally, a request is sent to the identified server for accessing the desired information and/or service.

In a particular embodiment, the user workstation is connected to the Internet network and comprises a Web Browser application. Servers are Web servers and the information or/and the service are Web pages linked to the items marked on the physical document and selected by the user when pressing the touch foil on the corresponding mark on the document.

23 Claims, 13 Drawing Sheets

*FIG. 4*

David Nash Ford

Early British Kingdoms http://freespace.virgin.net/

Document: 387

© Celtic World Ltd., Binfield, Berkshire, UK (1999)

FIG. 5

Arthur the Myth.

Some people believe that King Arthur is so inextricably tied up in Celtic Mythology that he must, in origin, have been, not a man at all, but a God. Like so many other characters featured in the Mabinogion, Arthur is his earliest form, appears almost entirely mythical. He and his companions have superhuman strength and abilities, and consort with giants and other mythological creatures. In the early Welsh poem "Preiddeu Annwfn", Arthur visits the Celtic Underworld, Annwfn. Even in Geoffrey and Malory, upon being fatally wounded in battle, Arthur is carried to the mystical Avalon, apparently the Underworld home of the Celtic god, Afallach. Many legends around the country attest to Arthur's immortality, for he sleeps in one of numerous caves waiting to return and lead his people. The name Arthur itself appears to derive from the Celtic word Art, meaning "bear". Could Arthur, like so many other Celtic gods, be merely a personification of the many revered animals of the wild? Later to become humanized like Beli Mawr or Bran the Blessed. The constellation of Ursa Major or the Great Bear is, after all, sometimes know as Arthur's Wain. There was indeed a Celtic Bear-God, Artio, worshipped in Switzerland and around Trier, but she was, in fact, a goddess and there is no trace of her in Britain! Some theorists claim Arthur was a late addition to the Celtic pantheon during a resurgence in pagan worship, or possibly a mythical hero, the offspring of a human and a bear. There is no evidence for either.

FIG. 6

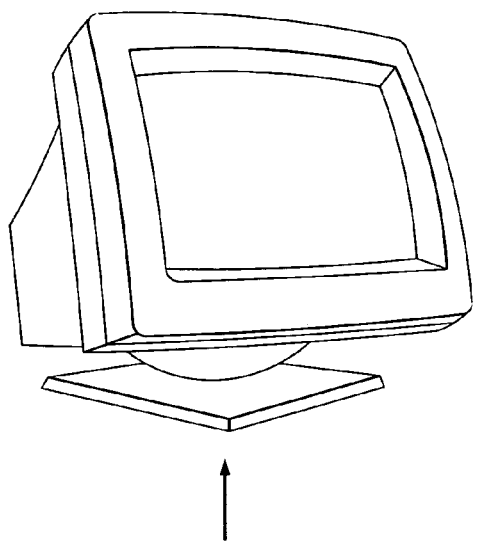

Doc  1  2  3  4  5  6  7  8  9  0  Pg

Arthur the Myth.

Some people believe that King Arthur is so inextricably tied up in Celtic Mythology that he must, in origin, have been, not a man at all, but a God. Like so many other characters featured in the <u>Mabinogion</u>, Arthur is his earliest form, appears almost entirely mythical. He and his companions have superhuman strength and abilities, and consort with giants and other mythological creatures. In the early Welsh poem "Preiddeu Annwfn", Arthur visits the Celtic Underworld, Annwfn. Even in Geoffrey and Malory, upon being fatally wounded in battle, Arthur is carried to the mystical <u>Avalon,</u> apparently the Underworld home of the Celtic god, <u>Afallach.</u> Many legends around the country attest to Arthur's immortality, for he sleeps in one of numerous caves waiting to return and lead his people. The name Arthur itself appears to derive from the Celtic word Art, meaning "bear". Could Arthur, like so many other Celtic gods, be merely a personification of the many revered animals of the wild? Later to become humanized like <u>Beli Mawr</u> or Bran the Blessed. The constellation of Ursa Major or the Great Bear is, after all, sometimes know as Arthur's Wain. There was indeed a Celtic Bear-God, Artio, worshipped in Switzerland and around Trier, but she was, in fact, a goddess and there is no trace of her in Britain! Some theorists claim Arthur was a late addition to the Celtic pantheon during a resurgence in pagan worship, or possibly a mythical hero, the offspring of a human and a bear. There is no evidence for either.

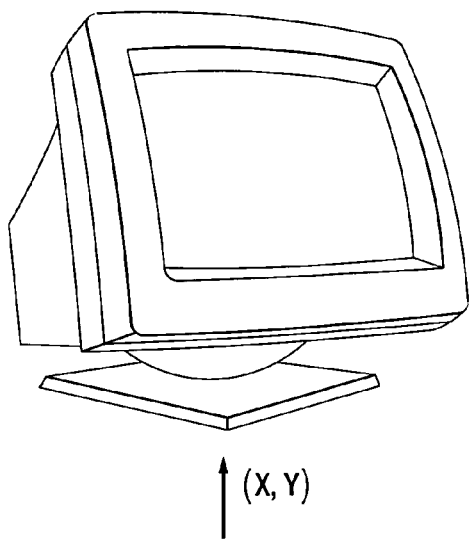

↑ (X, Y)

Doc  1  2  3  4  5  6  7  8  9  0  Pg

Arthur the Myth.

Some people believe that King Arthur is so inextricably tied up in Celtic Mythology that he must, in origin, have been, not a man at all, but a God. Like so many other characters featured in the Mabinogion, Arthur is his earliest form, appears almost entirely mythical. He and his companions have superhuman strength and abilities, and consort with giants and other mythological creatures. In the early Welsh poem "Preiddeu Annwfn", Arthur visits the Celtic Underworld, Annwfn. Even in Geoffrey and Malory, upon being fatally wounded in battle, Arthur is carried to the mystical Avalon, apparently the Underworld home of the Celtic god, Afallach. Many legends around the country attest to Arthur's immortality, for he sleeps in one of numerous caves waiting to return and lead his people. The name Arthur itself appears to derive from the Celtic word Art, meaning "bear". Could Arthur, like so many other Celtic gods, be merely a personification of the many revered animals of the wild? Later to become humanized like Beli Mawr or Bran the Blessed. The constellation of Ursa Major or the Great Bear is, after all, sometimes know as Arthur's Wain. There was indeed a Celtic Bear-God, Artio, worshipped in Switzerland and around Trier, but she was, in fact, a goddess and there is no trace of her in Britain! Some theorists claim Arthur was a late addition to the Celtic pantheon during a resurgence in pagan worship, or possibly a mythical hero, the offspring of a human and a bear. There is no evidence for either.

- 16 -

(X, Y)

Doc 1 2 3 4 5 6 7 8 9 0 Pg

FIG. 9

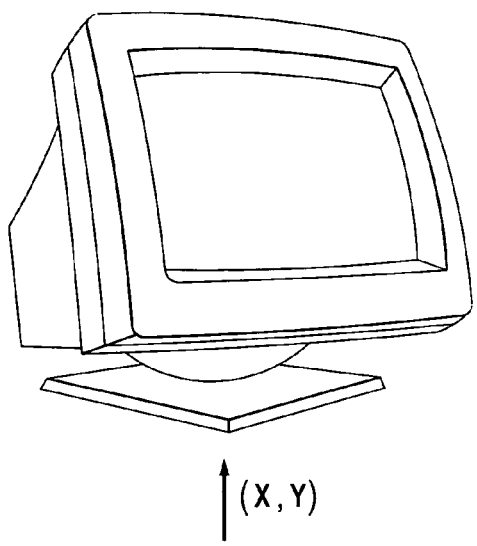

↑(X,Y)

Doc  1  2  3  4  5  6  7  8  9  0  Pg

Arthur the Myth.

Some people believe that King Arthur is so inextricably tied up in Celtic Mythology that he must, in origin, have been, not a man at all, but a God. Like so many other characters featured in the Mabinogion, Arthur is his earliest form, appears almost entirely mythical. He and his companions have superhuman strength and abilities, and consort with giants and other mythological creatures. In the early Welsh poem "Preiddeu Annwfn", Arthur visits the Celtic Underworld, Annwfn. Even in Geoffrey and Malory, upon being fatally wounded in battle, Arthur is carried to the mystical Avalon, apparently the Underworld home of the Celtic god, Afallach. Many legends around the country attest to Arthur's immortality, for he sleeps in one of numerous caves waiting to return and lead his people. The name Arthur itself appears to derive from the Celtic word Art, meaning "bear". Could Arthur, like so many other Celtic gods, be merely a personification of the many revered animals of the wild? Later to become humanized like Beli Mawr or Bran the Blessed. The constellation of Ursa Major or the Great Bear is, after all, sometimes know as Arthur's Wain. There was indeed a Celtic Bear-God, Artio, worshipped in Switzerland and around Trier, but she was, in fact, a goddess and there is no trace of her in Britain! Some theorists claim Arthur was a late addition to the Celtic pantheon during a resurgence in pagan worship, or possibly a mythical hero, the offspring of a human and a bear. There is no evidence for either.

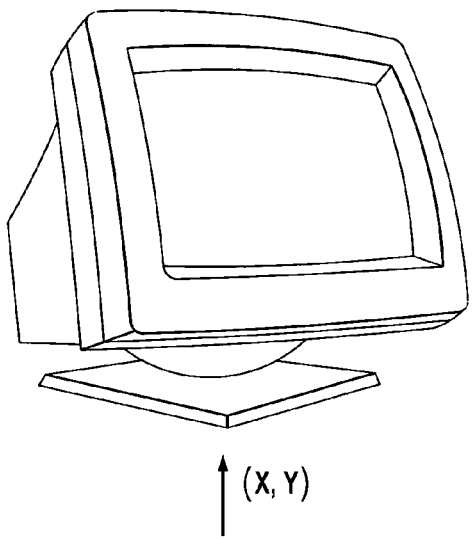

(X, Y)

```
Doc   1   2   3   4   5   6   7   8   9   0   Pg
```

Arthur the Myth.

Some people believe that King Arthur is so inextricably tied up in Celtic Mythology that he must, in origin, have been, not a man at all, but a God. Like so many other characters featured in the Mabinogion, Arthur is his earliest form, appears almost entirely mythical. He and his companions have superhuman strength and abilities, and consort with giants and other mythological creatures. In the early Welsh poem "Preiddeu Annwfn", Arthur visits the Celtic Underworld, Annwfn. Even in Geoffrey and Malory, upon being fatally wounded in battle, Arthur is carried to the mystical Avalon, apparently the Underworld home of the Celtic god, Afallach. Many legends around the country attest to Arthur's immortality, for he sleeps in one of numerous caves waiting to return and lead his people. The name Arthur itself appears to derive from the Celtic word Art, meaning "bear". Could Arthur, like so many other Celtic gods, be merely a personification of the many revered animals of the wild? Later to become humanized like Beli Mawr or Bran the Blessed. The constellation of Ursa Major or the Great Bear is, after all, sometimes know as Arthur's Wain. There was indeed a Celtic Bear-God, Artio, worshipped in Switzerland and around Trier, but she was, in fact, a goddess and there is no trace of her in Britain! Some theorists claim Arthur was a late addition to the Celtic pantheon during a resurgence in pagan worship, or possibly a mythical hero, the offspring of a human and a bear. There is no evidence for either.

Afallach, God of the Underworld

Afallach was the son of Lludd Llaw Ereint (the Silver-Handed). He was one of the Celtic gods of the Underworld. He ruled Avalon where he lived with his daughter, Modron, and her nine sisters. Avalon was like the Celtic heaven, a peaceful island far away where apples grew and after which it became named. It is, of course, best known as the place where the High-King Arthwyr was taken after he was fatally wounded at the Battle of Camlann, Afallach himself appears in Arthurian legends as King Evelake.

Return to Early British Kingdoms Home Page.

Doc: 387 -"Early British Kingdons" - Pg: 16 - "Afallach"

FIG. 12

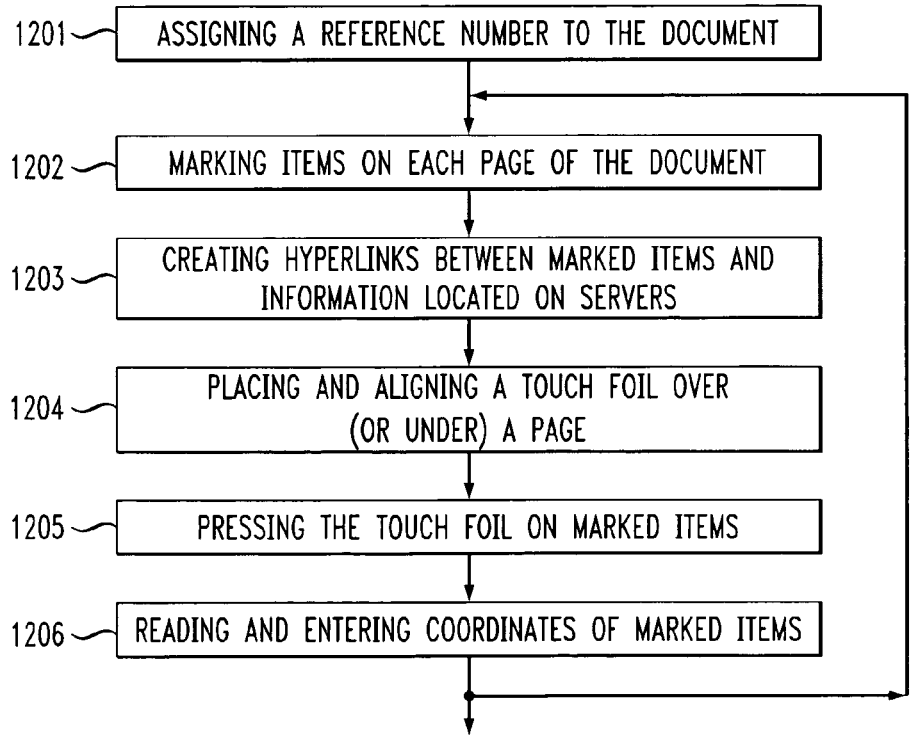

METHOD AND SYSTEM FOR ACCESSING INTERACTIVE MULTIMEDIA INFORMATION OR SERVICES BY TOUCHING MARKED ITEMS ON PHYSICAL DOCUMENTS

FIELD OF THE INVENTION

The present invention relates to interactive hypermedia systems and more particularly to a method and system for creating hyperlinks from physical documents (manuscripts or printed documents) to locally or remotely accessible servers and for triggering said hyperlinks simply by touching marked items (e.g., words, pictures, foot notes, symbols, icons) on said physical documents.

BACKGROUND OF THE INVENTION

Internet

The Internet (the "Net") is a global network of computers and computer networks. The Internet connects computers that use a variety of different operating systems or languages, including UNIX, DOS, WINDOWS, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet: transmitting and receiving electronic mail; logging into remote computers (the "Telnet"); and transferring files and programs from one computer to another ("FTP" or "File Transfer Protocol").

World Wide Web

With the increasing size and complexity of the Internet, tools have been developed to help find information on the network. These tools are often called navigators or navigation systems. Navigation systems that have been developed include standards such as Archie, Gopher and WAIS. The World Wide Web ("WWW" or "the Web") is a recent superior navigation system.

The Web is an Internet-based navigation system, an information distribution and management system for the Internet, and a dynamic format for communicating on the Web.

The Web seamlessly, for the user, integrates format of information, including still images, text, audio and video. A user on the Web using a graphical user interface ("GUI," pronounced "gooey") may transparently communicate with different host computers on the system, different system applications (including FTP and Telnet), and different information formats for files and documents including, for example, text, sound and graphics.

Hypermedia

The Web uses hypertext and hypermedia. Hypertext is a subset of hypermedia and refers to computer-based "documents" in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet.

Uniform Resource Locators

A resource of the Internet is unambiguously identified by a Uniform Resource Locator (URL), which is a pointer to a particular resource at a particular location. An URL specifies the protocol used to access a server (e.g., hyper text transfer protocol, FTP, or other protocol), the name of the server, and the location of a file on that server.

Hyper Text Transfer Protocol

Each Web page that appears on client monitors of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. All Web servers use a language or protocol to communicate with Web clients which is called Hyper Text Transfer Protocol ("HTTP"). All types of data can be exchanged among Web servers and clients using this protocol, including Hyper Text Markup Language ("HTML"), graphics, sound and video. HTML describes the layout, contents and hyperlinks of the documents and pages. Web clients when browsing convert user specified commands into HTTP GET requests, connect to the appropriate Web server to get information, and wait for a response. The response from the server can be the requested document or an error message. After the document or an error message is returned, the connection between the Web client and the Web server is closed.

The first version of HTTP is a stateless protocol. That is, with HTTP there is no continuous connection between each client and each server. The Web client using HTTP receives a response as HTML data or other data. This description applies to version 1.0 of HTTP protocol, while the new version 1.1 breaks this barrier of stateless protocol by keeping the connection between the server and client alive under certain conditions.

Browser

After receipt, the Web client formats and presents the data or activates an ancillary application such a sound player to present the data. To do this, the server or the client determines the various types of data received. The Web Client is also referred to as the Web Browser, since it in fact browses documents retrieved from the Web Server.

Interactive Access to Multimedia Services

Interactive electronic services, video-on-demand, and the World Wide Web are providing access to an increasing offering of movies, shopping information, games, multimedia documents, electronic commerce and many other services. A major problem in using these systems is to browse the enormous variety and quantity of possible choices to discover what is available, and to make a selection. By example, when surfing on the Web, a conventional method to navigate across many pages of hypertext documents consists of using search tools or invoking bookmarked links to the different required topics. When surfing on video-on-demand services, a conventional method to navigate is to surf on channels. Advertisements on preview channels are used as entry points to other movies. Users can navigate and make selections from a remote control using hierarchical menus. Obviously, these approaches do not allow a rapid access and browsing of the thousands of multimedia documents that are available on the Web or interactive TV.

The present invention is based on the recognition of two significant facts. The first fact is that people are very skilled at browsing through paper catalogs, magazines, newspapers, maps and books by flipping through the pages and glancing at pictures and text.

A collection of printed color photographs can be much easily and quickly browsed than a sequence of computer screens. Paper has a number of useful properties: paper is easy to read, mark, and manipulate; and paper is portable, familiar and can be easily distributed.

Many electronic systems attempt to replace paper by providing many advantages such as, for example, a better access to multimedia services. However, most users prefer to work with paper. It is difficult to foresee, for example, the replacement in the future, of paper catalogs by electronic catalogs (e.g., by Web accessible catalogs). The publication entitled "The Last Book", IBM Systems Journal, Vol 36, No. 3 Vol 36, No. 3-1997, by J. Jacobson, B. Comiskey, C. Turner, J. Albert, and P. Tsao of the MIT Media Laboratory, compares printed books and computer screens in the following terms:

"A book represents a fundamentally different entity than a computer screen in that it is a physical embodiment of a large number of simultaneous high-resolution displays. When we turn the page, we do not lose the previous page. Through evolution the brain has developed a highly sophisticated spatial map. Persons familiar with a manual or textbook can find information that they are seeking with high specificity, as evidenced by their ability to remember whether something that was seen only briefly was on the right side or left side of a page, for instance. Furthermore their haptic connection with the brain's spatial map comprises a highly natural and effective interface, when such information is embodied on actual multiple physical pages.

Another aspect of embodying information on multiple, simultaneous pages is that of serendipity and comparison. We may leaf through a large volume of text and graphics, inserting a finger bookmark into those areas of greatest interest. Similarly, we may assemble a large body of similar matter in order to view elements in contrast to one another, such as might be done to determine which of a particular set of graphical designs is most satisfying".

Out of those advantages the most important problem, of course, with traditional printed books is that they cannot be changed, amended, updated or completed.

During the last years, due mainly to the widespread use of personal computers and the universal access of millions of users to the World Wide Web, the "multimedia publishing" has veritably exploded. Due to the widespread penetration of CD-ROM drives an enormous amount of multimedia titles combining text, images and sounds, are now accessible to owners of personal computers. In this evolution, an incredible amount of hypermedia information is today accessible via the Internet on the World Wide Web.

Even when the public's enthusiasm for new computer-based multimedia services has been seen by many analysts as a threat to the conventional forms of hard-copied publishing, particularly book publishing, the real fact is that reading a book cannot be compared with reading an electronic media. Reading paper remains preferable for most people, whether they are familiar with computers or not.

The second fact is that touching directly the objects we have around is one of the simplest, most instinctive, and universal human actions. Finger pointing and touching are the most natural form of human/machine interface. The action of touching is so simple and natural that navigating by means of touch screens require no training and no learning. In fact, the pervasiveness robustness and versatility of the "touch technology" is transforming the way people are living, working, learning, and playing. The "touch technology" is successfully used in many different applications. For instance, in industrial environments, environmentally-robust touch screens are increasing productivity under hazardous and hostile conditions that would cripple a standard Personal Computer and keyboard. In hospitals, touch input helps doctors to prescribe medications to patients faster by allowing handwritten prescriptions. In retail locations, interactive, through-the-window displays let customers shop whenever they want, even when a store is closed. In mobile and consumer devices, touch and stylus input is the widely accepted input method for portable, and other mobile devices. At tourist destinations, user-friendly kiosks are a cost-effective way to help travelers to get information and make their own reservations.

The two main advantages of touching are simplicity, as touching with the fingertip is the simplest and more intuitive form of pointing and selecting an item, and versatility, as touching is particularly adapted to applications where the use of a keyboard, a mouse or an optical pencil or stylus is not practical or is not well adapted to the user's service or comfort.

Traditionally, a touch panel is integrated into the computer display. The touch panel and the display forms a combination called "touch screen". The input device is integrated into the monitor, so no space is wasted, and the interaction of the user with the system is made easier. The system guides the user by showing different choices in the form of icons displayed on the screen. When the user touches the icon of its choice, the associated action is executed.

Therefore, there is a real need to provide the user with new systems and methods for improving printed texts with electronically stored data in the form of images, sounds and/or additional text.

U.S. Pat. No. 5,957,697, entitled "Printed Book Augmented with an Electronic Virtual Book and Associated Electronic Data", discloses a system and method for augmenting a printed text with electronically stored data in the form of images, sounds and/or additional text where a printed book comprising a plurality of pages of text is emulated by an electronic virtual book, that mimics the appearance of the printed book. This invention is based on the duplication of the paper book, on the creation of an electronic book over which links to hypermedia are defined and can be selected by the user.

U.S. Pat. No. 5,903,729, entitled "Method, System, and Article of Manufacture for Navigating to a Resource in an Electronic Network", discloses a method for navigating on an electronic network. The method comprises the steps of forming an electronic image of an object having a plurality of markable regions associated with a plurality of electronic resources; processing the electronic image to detect which of the markable regions associated with the plurality of electronic resources is marked; generating a list comprising at least one link to at least one of the electronic resources whose associated markable region is marked, and displaying a display screen based upon the list. However, this invention requires image scanning and image processing means to read marked regions on hard-copied documents.

A similar approach, using optical image scanners to access multimedia services, is described in U.S. Pat. No. 5,640,193, entitled "Multimedia Service Access by Reading Marks on an Object". This patent discloses an apparatus and a method to enable a user to control the selection of electronic multimedia services by means of a scanner for reading marks on an object and for communicating a request signal, having an object code representing the read marks, to a user interface.

U.S. Pat. No. 5,495,581, entitled "Method and Apparatus for Linking a Document with Associated Reference Information Using Pattern Matching" also uses image scanning and pattern matching techniques. This patent discloses an apparatus for linking a portion of a document with associated reference information, wherein the linked portion is designated by a predetermined attribute of the received document image, using among several other, a device for electronically scanning the electronic representation of the document image to locate said predetermined attribute of the document's image.

U.S. Pat. No. 5,905,251 entitled "Hand-held Portable WWW Access Terminal with Visual Display Panel and GUI-based WWW Browser Program Integrated with Bar Code Symbol Reader in a Hand-supportable Housing" discloses a portable hand-held WWW access terminal for accessing HTML-encoded documents located on the WWW. The terminal includes a bar code symbol reader in a hand-supportable housing for reading URL-encoded symbols specifying the location of HTML-encoded documents stored in information servers connected to the Internet and supporting the TCP/IP standard. This invention requires the marking of physical documents with bar code symbols and requires bar code readers to trigger hyperlinks.

Finally, a different approach for having an access to multimedia services from physical documents is proposed in U.S. Pat. No. 5,624,265, entitled "Printed Publication Remote Control for Accessing Interactive Media". This patent discloses a remote control system for an interactive media comprising a printed publication (such as a book, a magazine or a catalog), and one or a plurality of buttons physically attached to the printed publication to allow users to remotely control use of associated electronic content by a host device.

From the prior art analysis, there is a real, uncovered need, for a new system and method of controlling the selection and the access to multimedia services simply by touching with the fingertip items (i.e., words, icons, figures, foot notes, etc.) printed on books and more generally on any type of physical document.

SUMMARY OF THE INVENTION

It is an advantage of the present invention that it improves the current systems and methods for selecting and accessing electronic multimedia services provided by one or a plurality of servers connected on a communication network.

It is another advantage of the present invention that it can selects and access said electronic multimedia services directly from physical documents.

It is a particular advantage of the present invention that it can select and access an electronic multimedia service simply by touching a mark or a symbol highlighted in a physical document.

The present invention discloses a method of selecting and accessing information or service by touching marked items on a physical document, for use in a user system connected to a communication network comprising one or plurality of servers. The method comprises the steps of identifying a physical document; said physical document comprising one or a plurality of pages; identifying a page of said physical document; determining the position of a point pressed on a touch foil; said touch foil being placed and aligned over or under the identified page of the physical document; said page comprising one or a plurality of marked items; said touch foil being pressed at a point corresponding to a selected marked item; identifying the selected marked item referring to a hyperlink table, said hyperlink table comprising an indication of the position of each marked item on the identified page; identifying information or service associated with the selected marked item referring to said hyperlink table, said hyperlink table comprising for each marked item of each page of the document the identification on a server of the information or service associated with the selected marked item; and accessing the information or service associated with the selected marked item.

The present invention also discloses a method of creating hyperlinks, by touching marked items on a physical document, for use in a user system connected to a communication network comprising one or plurality of servers. The method comprises the steps of creating a hyperlink table for a physical document; said physical document comprising one or a plurality of pages; storing in said hyperlink table an identification of the physical document; for each page of said physical document, storing in said hyperlink table an identification of the page, storing in said hyperlink table an identification within the communication network of information or service associated with each marked item and determining the position of points pressed on a touch foil; said touch foil being placed and aligned over or under the page of the physical document; said page comprising one or a plurality of marked items; said touch foil being pressed at points corresponding to marked item; and storing the position of the points pressed in the hyperlink table, said hyperlink table comprising for each marked item, an indication of its position on the page.

The foregoing, together with other features and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 4 shows a physical document;

FIG. 5 shows how items to access information on servers are marked in accordance with a preferred embodiment of the present invention;

FIG. 6 shows how touch foil is placed on a document in accordance with a preferred embodiment of the present invention;

FIG. 7 shows how the user presses the touch foil over marked items in accordance with a preferred embodiment of the present invention;

FIG. 9 shows how to use the touch foil to enter a document's page number in accordance with a preferred embodiment of the present invention;

FIG. 10 shows how the user presses the touch foil over selected item in accordance with a preferred embodiment of the present invention;

FIG. 11 shows how the information linked with the item touched on the document is shown in accordance with a preferred embodiment of the present invention;

FIG. 12 is a flow chart of the method of creating hyperlinks on a physical document in accordance with a preferred embodiment of the present invention;

DETAILED DESCRIPTION OF THE INVENTION

The present invention discloses a system and method for selecting and accessing multimedia information and/or services located on one or a plurality of servers connected to a communication network simply by touching with a finger items marked on a physical document or on any other physical surface. The system includes a touch foil placed over (or under) the document for reading coordinates of selected marked items, and an user workstation for accessing the information and/or the service associated with the selected marked items.

Items marked on the documents are selected by pressing the touch foil placed over (or under) the document. Once a marked item is selected, the user workstation receives from the touch foil a signal indicating the position of the selected marked item. The user workstation identifies in a hyperlink table a server and, within this server, the information and/or the service associated with the position of the selected marked item. Finally, a request is sent to the identified server for accessing the desired information and/or service.

In a particular embodiment, the user workstation is connected to the Internet network and comprises a Web Browser application. Servers are Web servers and the information or/and the service are Web pages linked to the items marked on the physical document and selected by the user when pressing the touch foil on the corresponding mark on the document.

System for Selecting and Accessing Multimedia Information

Figure 1:
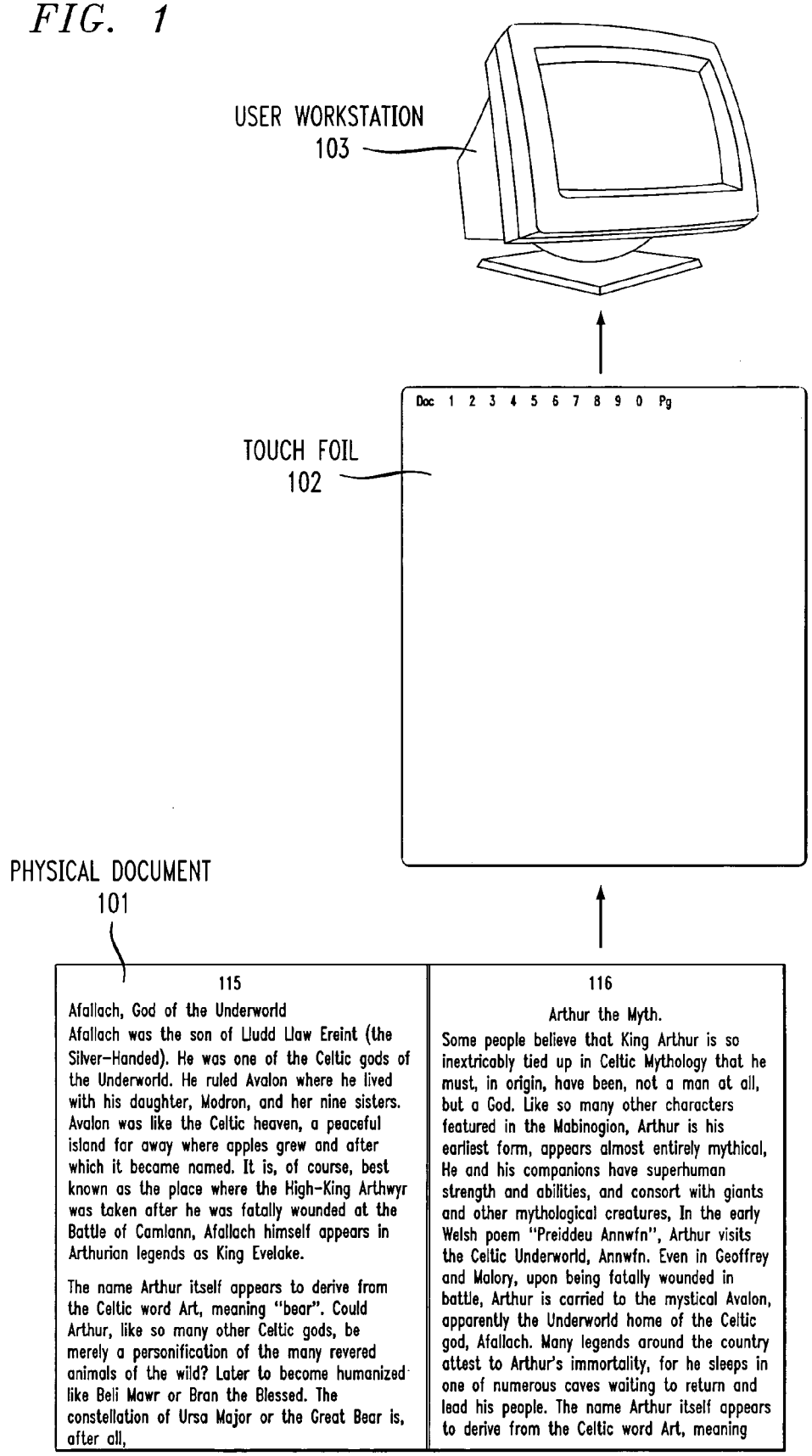
FIG. 1 shows the main components of the invention in accordance with a preferred embodiment of the present invention.

As shown in FIG. 1, the system according to the present invention comprises a hard-copy document 101 (e.g., a book) with printed marks identifying links to multimedia information and/or services on servers, a touch foil 102 (to be placed over or underneath a page of the document), and a user workstation 103 for accessing and displaying multimedia information and services.

Physical Document

The physical document 101 can be of any kind, for example, a newspaper, a geographic map, a novel book, a text book, a technical book, a commercial catalog or even any other type of engraved or printed surface (e.g., a painting in a museum of art). The material of the document can be paper, plastic, wood or other material. The marks identifying links from some items of the document to multimedia information or services on servers can be printed marks placed by the document's author or they could be any kind of mark of annotation written by the user. For example, each photograph or advertisement in a newspaper, magazine, or catalog can be accompanied by a printed mark.

Touch Foil

The touch foil 102 may be made of transparent resistive or capacitive films of the type used commonly to manufacture touch screens. The generated signal is generally proportional to the coordinates of the point pressed. One example of touch foil it would be possible to use is the TouchTek4 (4-wire Analog Resistive Touchscreens) of MICRO TOUCH company (TouchTek™ is a trademark of the MICRO TOUCH Company). The TouchTeck4 technology is fully described in the Web site of MICRO TOUCH Company at http://www.microtouch.com/.

Figure 2:
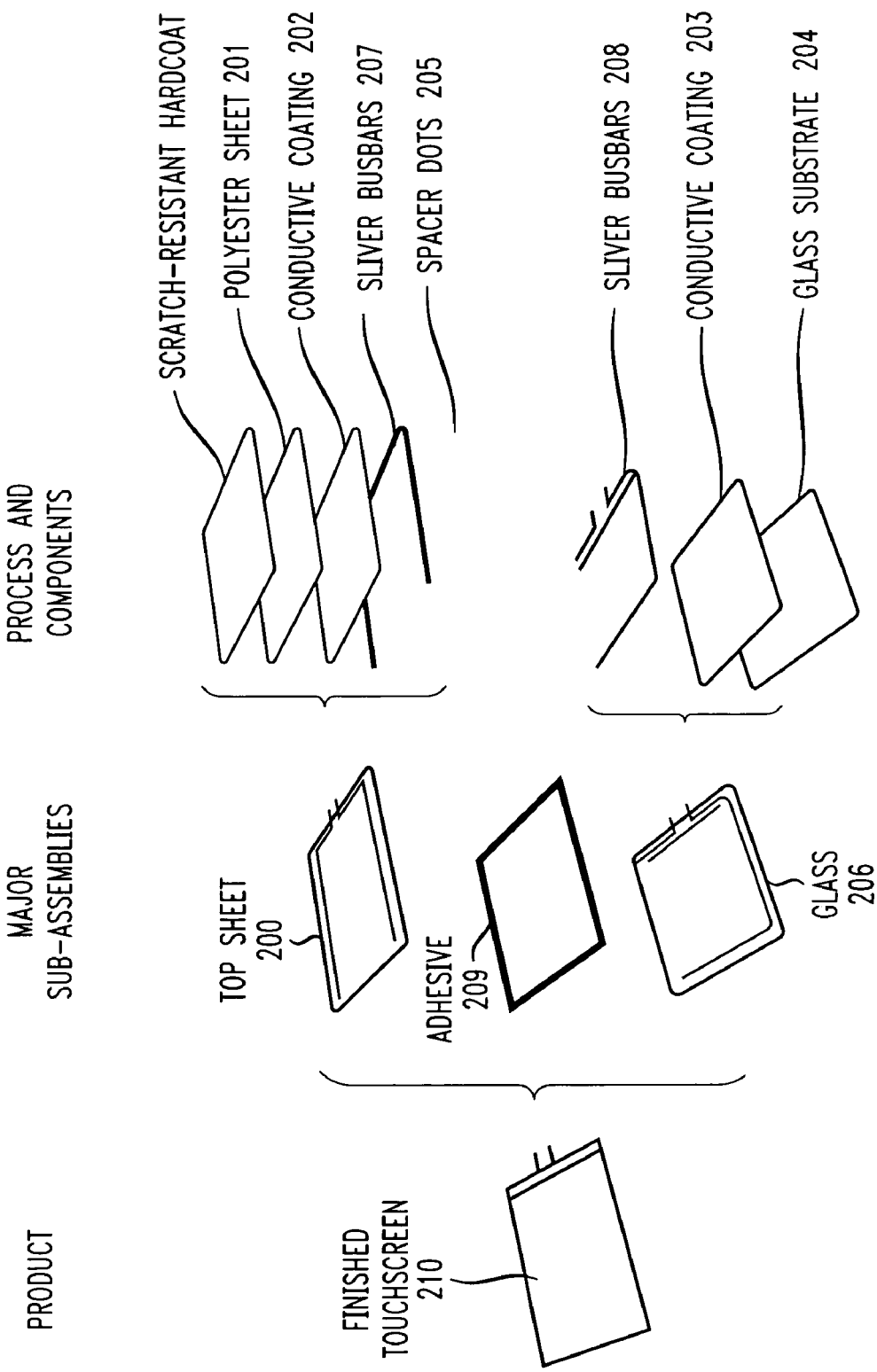
FIG. 2 shows an example of touch foil technology in accordance with a preferred embodiment of the present invention.

As illustrated in FIG. 2, TouchTek4 touch screens 210 use a polyester sheet 201 with a conductive coating 202 as a vertical conductive electrode, providing one-half of a touch coordinate. The topsheet 200 is separated from the bottom layer, a glass substrate 204 with a conductive coating 203, by spacer dots 205. The bottom sheet 206 is attached to the top sheet 200 by means of an adhesive 209. The bottom sheet 206 forms the horizontal conductive electrode, generating the second half of the touch coordinate. Silver bussbars located on the topcoat 207 and on the bottom sheet 208 pass the touch coordinates to the touchscreen controller. TouchTek4 touchscreens feature hard-coated polyester topsheets 200, available in several surface finishes. Spacer dots 205 are available in several dot arrays, optimized for finger, pen and finger, or pen-only input. The conductively-coated glass bottom sheet 203, 204 is available in several thicknesses. Electronic control is provided by a serial controller, or by 4-wire controllers. TouchTek4's specifications include narrow inactive border areas and compact touch sensors which allow system designers and OEMs to provide the largest useable screen area and full mouse emulation without sacrificing functionality or consuming excess power. Apart from being suited for implementing the functions of this invention, TouchTek4 touchscreens are commonly used in hand-held personal information management systems, PDAs, mobile computing systems, automotive, diagnostics and telecom devices, and Internet appliances. TouchTek4 touchscreens are engineered to accept more than three million touches to any area of the screen.

User Workstation

The user workstation 103 is used to access information and/or services located on servers connected on the network.

The user workstation may be, for example, an Internet appliance, a multimedia Personal Computer (PC), a set-top box, a TV monitor, a game console . . . The touch foil may communicate with the user workstation by means of a cable, a wire pair, an infrared link, or a wireless radio link.

Information and/or Service Access

In order to retrieve and display a multimedia information or to access a multimedia service associated with a marked item on a document 101, the user touches with his or her finger or exercises a pressure on the portion of the touch foil 102 placed over (or under) the marked item he or she wishes to select. The position of the marked item selected on the touch foil identifies the server and the information within this server the user wants to access. The user workstation 103 then accesses the identified server and retrieves and displays the information or/and service associated with the selected marked item.

World Wide Web

Figure 3:
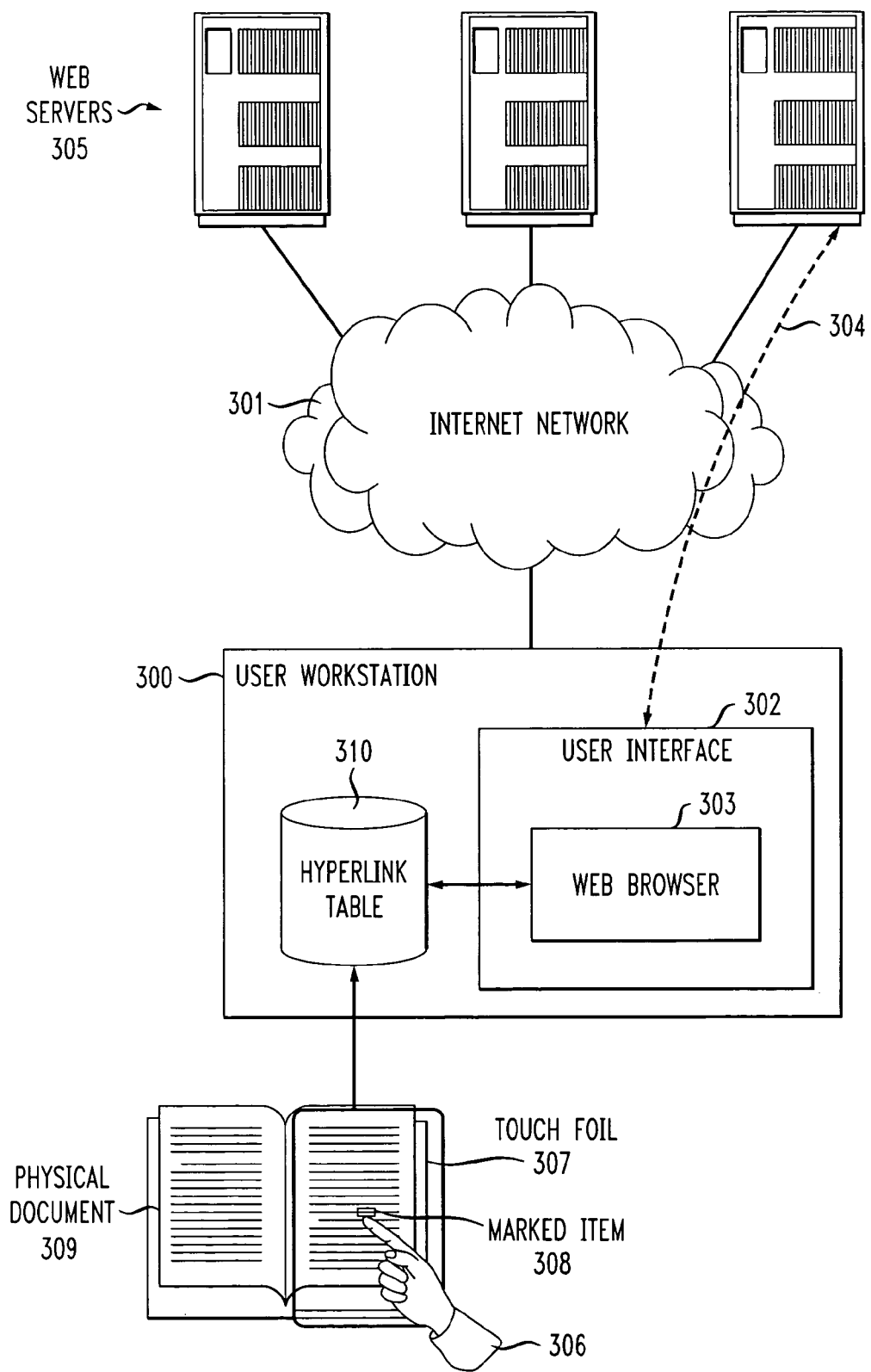
FIG. 3 shows the process of selection and access to Web pages from items marked on a physical document in accordance with a preferred embodiment of the present invention.

In the particular embodiment of the invention shown in FIG. 3, the user workstation 300 is connected to the Internet network 301. The user workstation comprises a user interface 302 including a Web Browser 303 (also called "Web Client") to access the World-Wide-Web (WWW). In order to access the Web pages associated with a marked item on a document 309, the user touches with its finger 306 the touch foil 307 placed over or under the marked item 308 he wishes to select. The position of the marked item selected on the touch foil identifies the Web server 305 and the Web pages the user wants to retrieve and display. The Web Browser program 303 sends an HTTP request 304 to the identified Web Server 305. The response to the request (HTTP response) is sent by the Web Server 305 in the reverse direction to the Web Browser 303. The HTTP response comprises the requested Web pages associated with the selected marked item.

Selection and Access to Information or/and Services on Servers

A) Creating Hyperlinks on a Physical Document

As shown in FIG. 12, the method for creating hyperlinks from a hand written or printed document (like the document shown in FIG. 4 entitled "Early British Kingdoms"), to a plurality of servers to access multimedia information or services, comprises the steps of: assigning a reference number (identifier) to the document (step 1201); for each page of the document (or portion of the document): marking items (hyperlinks) on the page (step 1202); creating hyperlinks between these marked items and information and/or services located on servers (step 1203); placing and aligning a touch foil over (or under) the page (step 1204); pressing the touch foil on marked items on this page (step 1205); reading and storing in a hyperlink table the coordinates of marked items on this page (step 1206).

Assigning a Reference Number to the Document

As shown in FIG. 4, for each document he receives, the user assigns a reference number (identifier) to this document (e.g., 387) for identifying said document, writes this reference number (identifier) on the document, and creates a hyperlink table associated with the document and accessible from the workstation, said hyperlink table comprising the reference number of the document and other relevant information related to the document such as title, author, ISBN (International Standard Book Number), or date. The hyperlink table may be stored within the user workstation or may be stored in an external memory accessible from the user workstation.

The header of the new created hyperlink table associated with the document shown in FIG. 4, can be built as follows:

| Doc: 0387 | Title: "Early British Kingdoms" | Author: David Nash Ford of Binfield, Berkshire, UK |
|---|---|---|
| | Date: 28/01/2000 | ISBN: 84-344-0856-2 |
| Pg: | | |
| X= |Y= | Link: | |

Marking Items on Pages of the Document and Creating the Hyperlinks Between These Items and Information and/or Services Located in Servers As shown in FIG. 5, each time the user wants to create a hyperlink for an item on a page of a document, he marks the item on the page of the document (e.g., by underlining it), enters the page number where the item is marked in the hyperlink table of the document (e.g., 16), associates this item with a destination address within the communication network, this destination address identifying a server connected to the communication network and the information and/or services within this server the user wants to access, and enters the destination address associated with this item (e.g., an URL address for example) in the hyperlink table.

The hyperlink table associated with the page shown FIG. 5, can be built as follows:

| Doc: 0387 | Title: "Early British Kingdoms" | Author: David Nash Ford of Binfield, Berkshire, UK |
|---|---|---|
| | Date: 28/01/2000 | ISBN: 84-344-0856-2 |
| Pg: 16 | | |
| X= |Y= | Link: Mabinogion | http://www.cyberphile.co.uk/~taff/taffnet/mabinogion/mabinogion.htm |
| X= |Y= | Link: Avalon | http://freespace.virgin.net/david.ford2/avalon.html |
| X= |Y= | Link: Afallach | http://freespace.virgin.net/david.ford2/gods.html#Afallach |
| X= |Y= | Link: Beli Mawr | http://freespace.virgin.net/david.ford2/gods.html#Beli |

Placing and Aligning the Touch Foil over a Page of the Document

As shown in FIG. 6, after the hyperlinks of a page have been defined in the hyperlink table associated with the document, the touch foil is placed over (or under) the page, and aligned with the borders of this page by some conventional means (e.g., by adjusting the upper left corner of the touch foil with the upper left corner of the page).

Reading the Coordinates of Hyperlinked Items on the Page

As shown in FIG. 7, for each item previously marked on the page ("Mabinogion", "Avalon", "Afallach", "Beli Mawr"), the user presses (e.g., by the finger tip) the touch foil on the corresponding mark to determine the position (for instance, the coordinates) of the item on the page.

Once the measure of the coordinates of each marked item on the page is completed, the hyperlink table is updated as follows:

B) Triggering Hyperlinks from a Physical Document

Figure 13:
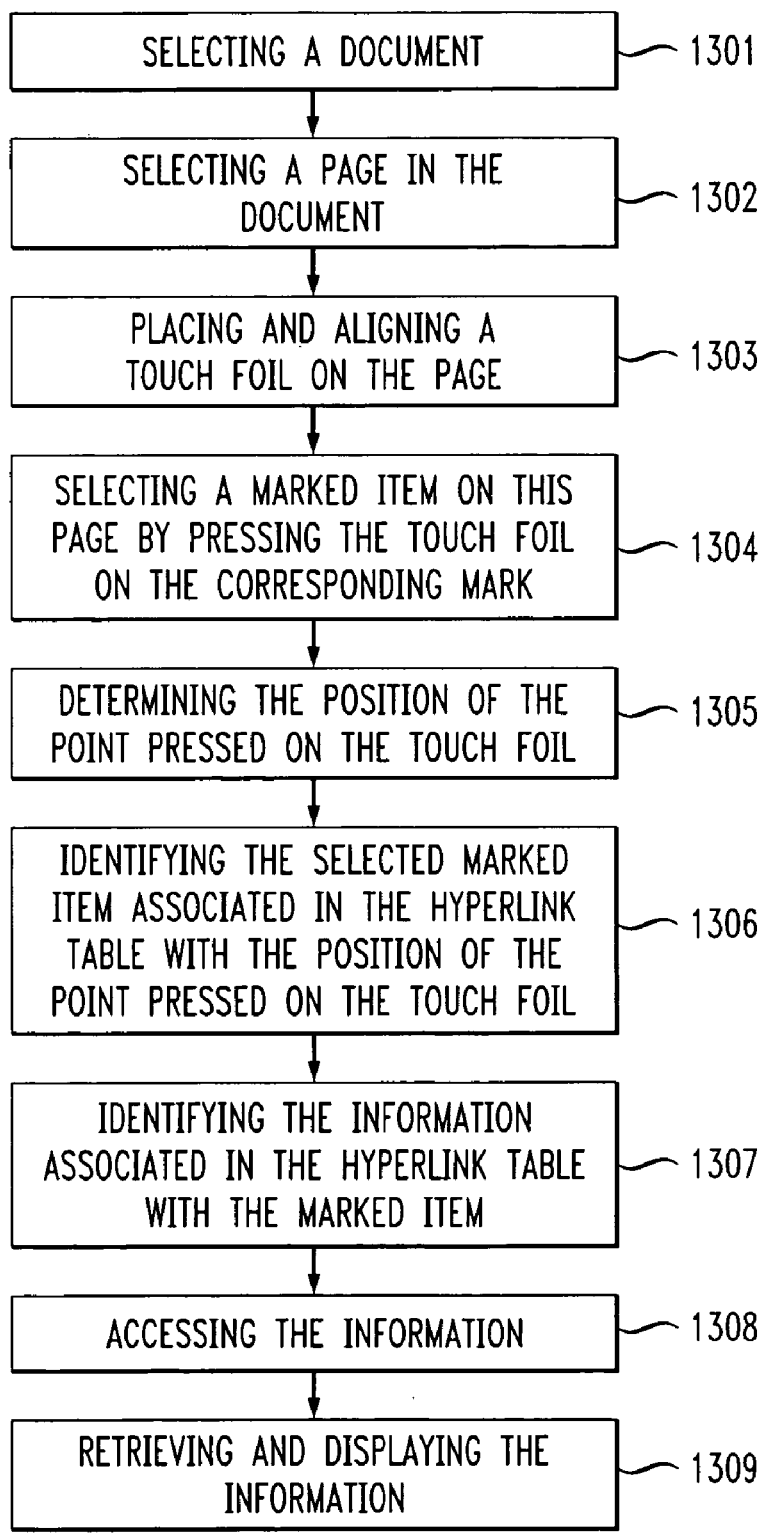
FIG. 13 is a flow chart of the method of triggering hyperlinks on a physical document in accordance with a preferred embodiment of the present invention.

The user receives a hand written or printed document, like the document entitled "Early British Kingdoms", (Doc: 387) shown in FIG. 4. Hyperlinks have been previously defined between items marked on the pages and information and/or services on servers connected on the communication network. As shown in FIG. 13, the method for triggering hyperlinks and to access information and/or services directly from the items marked on the pages of the physical document comprises the steps of: selecting a document by entering the reference number of this document (step 1301); selecting a page comprising one or a plurality of marked items (step 1302); placing and aligning a touch foil over (or under) the selected page (step 1303); selecting a marked item on this page by pressing the touch foil on the corresponding mark (step 1304); determining the position of the point pressed on the touch foil (step 1305); identifying the

| Doc: 0387 | Title: "Early British Kingdoms" | Author: David Nash Ford of Binfield, Berkshire, UK | |
|---|---|---|---|
| | Date: 28/01/2000 | ISBN: 84-344-0856-2 | |
| Pg: 16 | | | |
| X = 30 /Y = 95 | Link: Mabinogion | http://www.cyberphile.co.uk/~taff/taffnet/mabinogion/mabinogion.htm | |
| X = 255 /Y = 150 | Link: Avalon | http://freespace.virgin.net/david.ford2/avalon.html | |
| X = 225 /Y = 160 | Link: Afallach | http://freespace.virgin.net/david.ford2/gods.html#Afallach | |
| X = 190 /Y = 230 | Link: Beli Mawr | http://freespace.virgin.net/david.ford2/gods.html#Beli | |

For example, page 16 of document 387 entitled "Early British Kingdoms" written by David Nash Ford of Binfield, the coordinates of the underlined word "Mabinogion" are X=30/Y=95. This underlined word "Mabinogion" points to the URL address http://www.cyberphile.co.uk/~taff/taffnet/mabinogion/mabinogion.htm.

Using the herein described method for the different pages of a same document, the hyperlink table would appear like this:

selected marked item referring to a hyperlink table, this hyperlink table comprising an indication of the position of each marked items on the selected page of the document (step 1306); identifying the information or/and the service associated with the selected marked item referring to the hyperlink table, this hyperlink table comprising for each marked item of the selected page the identification of the requested information and/or service within the network (preferably by means of a destination address) (step 1307);

| Doc: 0378 | Title: "Early British Kingdoms" | Author: David Nash Ford of Binfield, Berkshire, UK |
|---|---|---|
| | Date: 28/01/2000 | ISBN: 84-344-0856-2 |
| Pg: 3 | | |
| X = 45 /Y = 130 | Link: Buellt & Gwerthrynion | http://freespace.virgin.net/david.ford2/buellt.html |
| X = 205 /Y = 170 | Link: Caer-Baddan (Bath) | http://freespace.virgin.net/david.ford2/south.html#Gloui |
| X = 75 /Y = 190 | Link: Caer-Celemion (Silchester) | http://freespace.virgin.net/david.ford2/vortigern.html |
| X = 110 /Y = 255 | Link: Ceredigion | http://freespace.virgin.net/david.ford2/ceredigion.html |
| . | | |
| . | | |
| . | | |
| Pg: 16 | | |
| X = 30 /Y = 95 | Link: Mabinogion | http://www.cyberphile.co.uk/~taff/taffnet/mabinogion/mabinogion.htm |
| X = 255 /Y = 150 | Link: Avalon | http://freespace.virgin.net/david.ford2/avalon.html |
| X = 225 /Y = 160 | Link: Afallach | http://freespace.virgin.net/david.ford2/gods.html#Afallach |
| X = 190 /Y = 230 | Link: Beli Mawr | http://freespace.virgin.net/david.ford2/gods.html#Beli |
| . | | |
| . | | |
| . | | |
| Pg: 39 | | |
| X = 25 /Y = 30 | Link: St. Joseph of Arimathea | http://freespace.virgin.net/david.ford2/joseph.html |
| X = 80 /Y = 75 | Link: The Kings of Dumnonia | http://freespace.virgin.net/david.ford2/dumnonia.html |
| X = 140 /Y = 135 | Link: Eudaf Hen & Conan Meri. | http://freespace.virgin.net/david.ford2/eudanc.html |
| . | | |
| . | | |
| . | | | accessing the information and/or service (step 1308); retrieving and displaying this information and/or service (step 1309).

Entering the Reference Number of the Document

Figure 8:
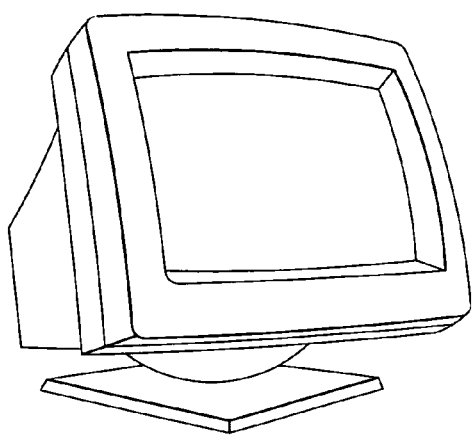
FIG. 8 shows how to use the touch foil to enter a document reference number in accordance with a preferred embodiment of the present invention.

By means of any user interface (keyboard, mouse, touch screen . . . ), the user enters the reference number (identifier) of the document (e.g., document 387) he wants to select. In the particular embodiment shown in FIG. 8, the user enters the reference number of the document (e.g., Doc: 387) by means of the array of pressure sensitive "touch buttons" printed on the top of the touch foil. The user presses in the following order: a touch button marked "Doc," and then numerical touch buttons corresponding to each digit of the document reference number (e.g., "3", "8" and "7"). This procedure gives access to the hyperlink table associated with this selected document.

Selecting a Page Comprising a Hyperlink

By means of any user interface (keyboard, mouse, touch screen . . . ), the user enters the page of the document (e.g., page 16) (or the portion of the document) he wants to select. In the particular embodiment shown in FIG. 9, by means of the array of pressure sensitive touch buttons printed on the top of the touch foil, the user enters the page number to select (e.g., Pg. 16). The touch foil can be on any position (normally the touch foil is placed over the page comprising the hyperlink to trigger). The user presses in the following order: a touch button marked as "Pg", and then numerical touch buttons corresponding to each digit of the page number (e.g., "1" and "6") to select. This procedure gives access to the selected page (e.g., Pg. 16) within the hyperlink table associated with the selected document (e.g., Doc: 387).

Placing and Aligning the Touch Foil Over or Under a Page of the Document

After having selected a document and a page in this document, the touch foil is placed over or under the page, and aligned with the borders of the selected page by some conventional means (e.g., by adjusting the upper left corner of the touch foil with the upper left corner of the page).

Selecting a Marked Item on This Page

As shown in FIG. 10, The user selects a marked item (Afallach) on the page by pressing (e.g., by means of his fingertip) the touch foil on the corresponding mark.

Determining the Position on the Page of the Point Pressed on the Touch Foil

The touch foil sends a signal to the user workstation to identify to selected marked item. This signal indicates the position on the page of the point that has been pressed by the user on the touch foil. The generated signal is generally proportional to the coordinates (X/Y) of the point pressed.

In our example, the touch foil measures the position on the page of the point pressed ("Afallach") by the user. The coordinates that are measured at this point are around X=225 and Y=160.

Identifying the Selected Marked Item

The marked item selected on the touch foil by the user is identifying thanks to the hyperlink table, said hyperlink table comprising an indication of the position (coordinates X, Y) of each marked items on each page of the document.

In our example, the coordinates measured by the touch foil are around (close to) X=225 and Y=160. They corresponds in the hyperlink table to the marked item "Afallach".

The hyperlink table is either stored locally in the user workstation, or is retrieved from a remote server and then stored locally in the use workstation or is stored in a remote server and is accessed remotely.

Identifying the Information Associated with the Selected Item

The hyperlink table comprises for each marked item of each page of the document the localization within the network of the requested information and/or service. The information and/or service may be localized by means of a destination address. In the Internet network, Web pages in Web Servers are identified by an URL (Uniform resource Locator).

In our example, the hyperlink table associates the marked item "Afallach" with the URL: http://freespace.virgin.net/david.ford2/gods.html#Afallach.

Accessing the Information and/or Service

The user workstation Web triggers the hyperlink (destination address, URL, . . . ) associated in the hyperlinks table, with the identified marked item.

In our example, the hyperlink labeled "Afallach" is triggered since the system determines from the hyperlinks table that, for this page (i.e., Pg. 16), X=225, Y=160 are the coordinates of the nearest hyperlink to the sensed position. Thus, in this example, simply pressing near the marked item "Afallach" will automatically trigger the following hyperlink on the Web: http://freespace.virgin.net/david.ford2/gods.html#Afallach Retrieving and Displaying the Requested Information and/or Service The information contained at the selected destination address (URL) can be displayed on the user workstation. As shown in FIG. 11, additional information (e.g., Document number, page number, marked item, foil coordinates and URL) related to the marked item selected by the user can be shown on the Web Browser along with the information retrieved from the Web Server.

Alternative Applications

Other several possible applications of the present invention are described below. Each of these applications basically use the same previously described method and system.

Installation and Engineering Instructions

A customer receives a complex computer equipment, with an installation manual comprising drawings and schemes of the parts and subassemblies. Theses parts and subassemblies are labeled with printed marks representing hyperlinks for accessing additional information on a remote Web server. When the customer touches one of those marked items, multimedia instructions to show how the part needs to be installed or serviced are instantly displayed. It is no more necessary to look through printed manuals to discover how a part is called and what to do with it. Furthermore, the customer does not need anymore to navigate on a computer terminal among different alternatives paging through multiple menus and choices and loosing the attention on the general picture and friendliness of the installation manual. A single printed copy of a general view of the equipment is sufficient to navigate with the system according to the present invention. The customer has just to press with his finger on the desired item over the physical of the installation manual.

Newspapers and Magazines

A subscriber reading a newspaper or magazine, may be interested in seeing computer multimedia or TV video information associated with the articles he reads. While reading the sports pages (e.g., on the New York Times), key events can be instantly recalled and played on demand (e.g., the opening ceremony of Melbourne Olympic Games, the last images of the "Tour de France," or the last tennis match on Winbledon) simply by touching a mark, an icon, or an underscored or bold printed word on pages of the newspaper.

Paper-Based Advertising Linked to On-Demand Multimedia Ads

Today, many free-toll calls originate from people reading advertisements in newspapers or magazines or in direct mail ads. According to the present invention, people can instantly access multimedia presentations simply by touching the ads that have drawn their attention.

Courses and Textbooks

Extensive reading is easier to do on paper, but animated video explanations and demonstrations are much more effective for some purposes. The two can be tied together by placing hyperlink marks in a textbook. These hyperlink marks can, for example, link the textbook to live discussion groups with other students or to live interactions with professors and tutors.

Particular Application

Hypermedia Access from a Paper Map

Figure 14:
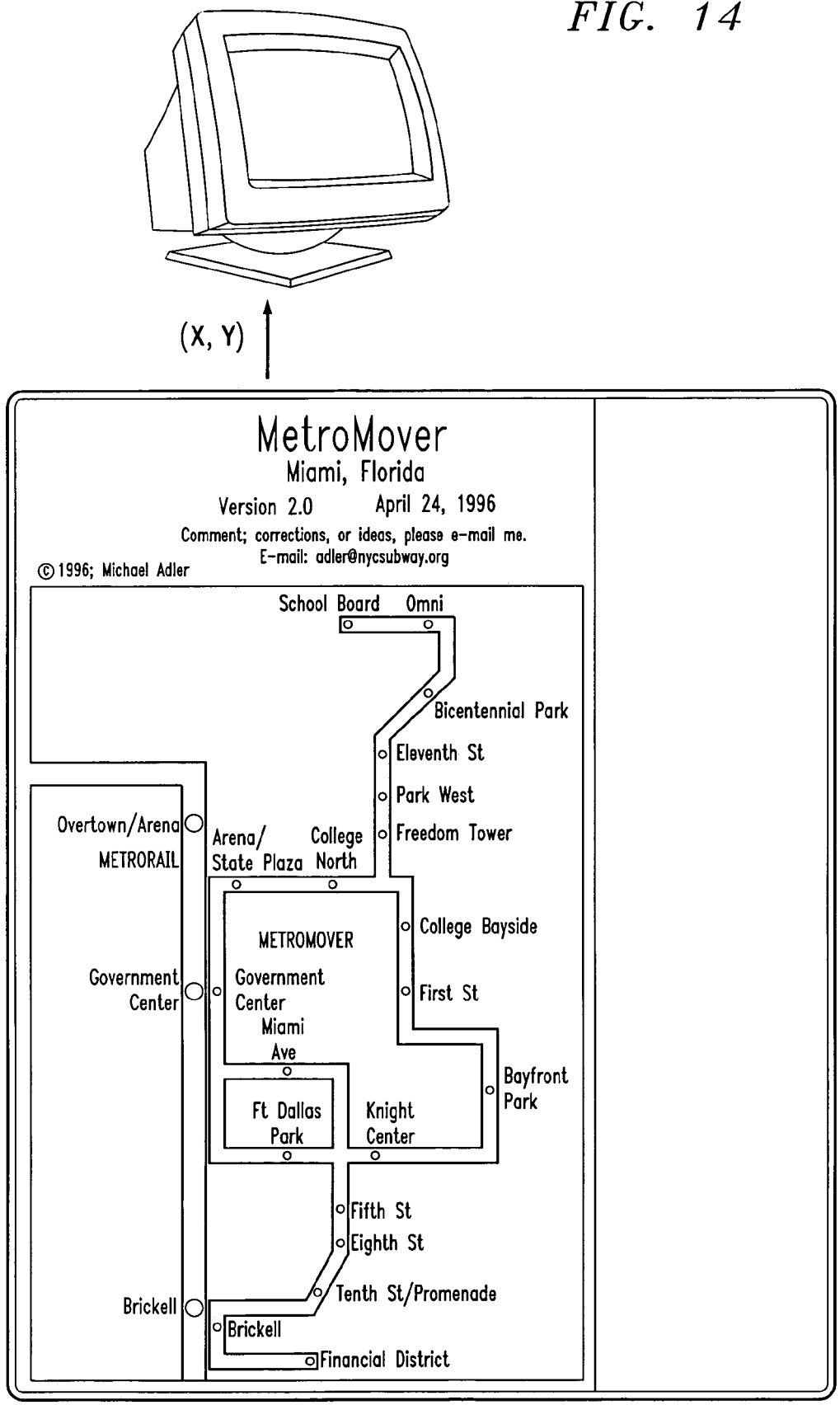
FIG. 14 shows the Miami MetroMover paper map placed underneath a touch foil.

In the particular example shown in FIG. 14, the map (e.g., a paper map of the MetroMover, Miami, Fla.) is placed and aligned over the touch foil. By pressing the map over any selected station name (small circles such as "Freedom Tower," "Financial District," or "Government Center"), the information on the Web associated with this foil position (i.e., the information related with the station selected on the map) is retrieved from the Web and displayed on the user Web Browser located in its workstation.

What has been described is merely illustrative of the application of the principles of the present invention. Other arrangements and methods can be implemented by those skilled in the art without departing from the spirit and scope of the present invention.

What is claimed is:

1. A method of selecting and accessing information or services by touching marked items on a physical document, for use in a user system connected to a communication network comprising one or more servers, the method comprising the steps of:
   identifying a physical document, the physical document comprising one or more pages;
   identifying a page of the physical document;
   determining a position of a point pressed on a touch foil, the touch foil being placed and aligned over or under the identified page of the physical document, the identified page comprising one or more marked items, and the touch foil being pressed at a point corresponding to a selected marked item;
   identifying the selected marked item by referring to a hyperlink table, the hyperlink table comprising an indication of a position of each marked item on the identified page;
   identifying information or a service associated with the selected marked item by referring to the hyperlink table, the hyperlink table comprising, for each marked item of each page of the document, identification on a server of the information or the service associated with the selected marked item; and
   accessing the information or the service associated with the selected marked item.

2. The method according to claim 1 wherein the step of identifying a physical document further comprises the step of:
   accessing the hyperlink table associated with the identified physical document.

3. The method according to claim 1 wherein the step of identifying information or a service associated with the selected marked item by referring to the hyperlink table comprises the step of:
   determining, by referring to the hyperlink table, a destination address in the communication network where the information or the service associated with the selected marked item can be accessed.

4. The method according to claim 3 wherein:
   the communication network is an Internet Protocol (IP) network;
   the servers are Web servers;
   the user system comprises a Web browser;
   the destination address is a Uniform Resource Locator (URL address); and
   the information or the service comprises at least one Web page.

5. The method according to claim 1 wherein the physical document has a form and comprises a physical surface and a material, wherein the physical surface comprises an engraved, a printed, a painted, or a written surface, wherein the material comprises paper, wood, or plastic, and wherein the form comprises a newspaper, magazine, book, catalog, geographical map, photograph, or painting.

6. The method according to claim 1 wherein a marked item on a physical document comprises a word, a letter, an icon, a graphic, a symbol, or a mark.

7. The method according to claim 1 where the hyperlink table comprises additional information related to the physical document, the additional information comprising a title, an author, and a date, and wherein the method further comprises the step of:
   accessing the additional information.

8. The method according to claim 1 wherein the physical document comprises a plurality of pages and wherein the identified page is one page of the plurality of pages.

9. The method of claim 1, wherein the touch foil comprises a transparent touch foil, the touch foil being placed and aligned over the identified page of the physical document.

10. A system comprising:
    a user system comprising:
       means for identifying a physical document, the physical document comprising one or more pages;
       means for identifying a page of the physical document;
       means for determining a position of a point pressed on a touch foil, the touch foil being placed and aligned over or under the identified page of the physical document, the identified page comprising one or more marked items, and the touch foil being pressed at a point corresponding to a selected marked item;
       means for identifying the selected marked item by referring to a hyperlink table, the hyperlink table comprising an indication of a position of each marked item on the identified page;
       means for identifying information or a service associated with the selected marked item by referring to the hyperlink table, the hyperlink table comprising, for each marked item of each page of the document, identification on a server of the information or the service associated with the selected marked item; and means for accessing the information or the service associated with the selected marked item.

11. The system of claim 10:

further comprising the touch foil;

wherein the user system is connected to a communication network comprising one or more servers; and further comprising a transmitting means between the touch foil and the user system for transmitting the position of the points pressed on the touch foil.

12. A computer program stored on a computer readable medium, the computer program comprising:

a step to identify a physical document, the physical document comprising one or more pages;

a step to identify a page of the physical document;

a step to determine a position of a point pressed on a touch foil, the touch foil being placed and aligned over or under the identified page of the physical document, the identified page comprising one or more marked items, and the touch foil being pressed at a point corresponding to a selected marked item;

a step to identify the selected marked item by referring to a hyperlink table, the hyperlink table comprising an indication of a position of each marked item on the identified page;

a step to identify information or a service associated with the selected marked item by referring to the hyperlink table, the hyperlink table comprising, for each marked item of each page of the document, identification on a server of the information or the service associated with the selected marked item; and a step to access the information or the service associated with the selected marked item.

13. A method of creating hyperlinks by touching marked items on a physical document, for use in a user system connected to a communication network comprising one or plurality of servers, the method comprising the steps of:

creating a hyperlink table for a physical document, the physical document comprising one or more pages;

identifying a page of the physical document;

determining a position of points pressed on a touch foil, the touch foil being placed and aligned over or under the identified page of the physical document, the identified page comprising one or more marked items, the touch foil being pressed at points corresponding to a marked item;

storing in the hyperlink table an identification of the physical document for each page of the physical document;

storing in the hyperlink table an identification of the identified page;

storing in the hyperlink table an identification within the communication network of information or a service associated with each marked item; and storing, in the hyperlink table, positions of points corresponding to marked items, the hyperlink table comprising, for each marked item, an indication of its position on the identified page.

14. The method according to claim 13 wherein the step of storing in the hyperlink table an identification within the communication network of information or a service associated with each marked item comprises the step of:

storing a destination address in the communication network where the information or the service associated with the selected marked item can be accessed.

15. The method according to any claim 14 wherein:

the communication network is an Internet Protocol (IP) network;

the servers are Web servers;

the user system comprises a Web browser;

the destination address is a Uniform Resource Locator (URL address); and the information or the service is at least one Web page.

16. The method according to claim 13 wherein the physical document has a form and comprises a physical surface and a material, wherein the physical surface comprises an engraved, a printed, a painted, or a written surface, wherein the material comprises paper, wood, or plastic, and wherein the form comprises a newspaper, magazine, book, catalog, geographical map, photograph, or painting.

17. The method according to claim 13 wherein a marked item on a physical document comprises a word, a letter, an icon, a graphic, a symbol, or a mark.

18. The method according to claim 13 further comprising the step of:

storing in the hyperlink table additional information related to the document, the additional information comprising a title, an author, and a date.

19. The method according to claim 13 wherein the physical document comprises a plurality of pages and wherein the identified page is one page of the plurality of pages.

20. The system of claim 19, wherein the touch foil comprises a transparent touch foil, the touch foil being placed and aligned over the identified page of the physical document.

21. A system comprising:

a user system comprising:

means for creating a hyperlink table for a physical document, the physical document comprising one or more pages;

means for identifying a page of the physical document;

means for determining a position of points pressed on a touch foil, the touch foil being placed and aligned over or under the identified page of the physical document, the identified page comprising one or more marked items, the touch foil being pressed at points corresponding to a marked item;

means for storing in the hyperlink table an identification of the physical document for each page of the physical document;

means for storing in the hyperlink table an identification of the identified page;

means for storing in the hyperlink table an identification within the communication network of information or a service associated with each marked item; and means for storing, in the hyperlink table, positions of points corresponding to marked items, the hyperlink table comprising, for each marked item, an indication of its position on the identified page.

22. The system of claim 21:

further comprising the touch foil;

wherein the user system is connected to a communication network comprising one or a plurality of servers; and further comprising a transmitting means between the touch foil and the user system for transmitting the position of the points pressed on the touch foil.

23. A computer program stored on a computer readable medium, the computer program comprising:

a step to create a hyperlink table for a physical document, the physical document comprising one or more pages;

a step to identify a page of the physical document;

a step to determine a position of points pressed on a touch foil, the touch foil being placed and aligned over or under the identified page of the physical document, the identified page comprising one or more marked items, the touch foil being pressed at points corresponding to a marked item;

a step to store in the hyperlink table an identification of the physical document for each page of the physical document;

a step to store in the hyperlink table an identification of the identified page;

a step to store in the hyperlink table an identification within the communication network of information or a service associated with each marked item; and a step to store, in the hyperlink table, positions of points corresponding to marked items, the hyperlink table comprising, for each marked item, an indication of its position on the identified page.

\* \* \* \* \*

UNITED STATES PATENT AND TRADEMARK OFFICE
CERTIFICATE OF CORRECTION

| | | |
|---|---|---|
| PATENT NO. | : 7,373,588 B2 | Page 1 of 1 |
| APPLICATION NO. | : 10/786201 | |
| DATED | : May 13, 2008 | |
| INVENTOR(S) | : Fernando Incertis Carro | |

It is certified that error appears in the above-identified patent and that said Letters Patent is hereby corrected as shown below:

On the Title page of the issued patent, before line 30, please add item (63) entitled "Related U.S. Application Data" with the following information:

"Continuation of Application No. 09/782,144, filed on February 13, 2001."

In column 1, after line 5 of the patent, please add in a section with the following information:

"Cross-Reference to Related Application

This application is a continuation of U.S. Patent Application No. 09/782,144, filed on February 13, 2001, incorporated by reference herein."

Signed and Sealed this
Fourteenth Day of February, 2012

David J. Kappos
*Director of the United States Patent and Trademark Office*